Patented Apr. 24, 1945

2,374,212

UNITED STATES PATENT OFFICE 2,374,212

PROCESS OF EXTRACTING BIOTIN

Joseph V. Karabinos, Columbus, and Elmer R. Eckhardt and Wilbur I. Patterson, Chagrin Falls, Ohio, assignors to S. M. A. Corporation, Chicago, Ill., a corporation of New Jersey No Drawing. Application July 13, 1943, Serial No. 494,588

4 Claims. (Cl. 167—81)

This invention relates to the process of preparing a vitamin preparation having biotin activity and using as starting materials plant sources such as the fermentation residues from molasses and corn or other grains.

Heretofore preparations having biotin activity have used as process starting materials various animal source products such as the liver and other animal organs.

The isolation of biotin by any of the known processes is a long and expensive process not well suited to the large scale production of biotin or preparations having biotin activity. Examples of this are the isolation of biotin from egg yolk by Kogl and Tonnis (Z. Physiol. Chem., 242, 43 (1936) which illustrates the difficulties encountered. The process described by du Vigneaud, Hoffman, Melville and Gyorgy (J. Biol. Chem., 140,643, (1941) for the isolation of biotin from liver, while being a simpler process than the one from egg yolk still leaves much to be desired from cost and manufacturing difficulties standpoint.

We have discovered that a preparation having biotin activity may be selectively extracted by the use of certain organic solvents from fermentation residues of molasses and corn or other grain thereby simplifying to a great degree the hitherto known processes and using a starting material low in cost and readily obtainable.

Biotin (vitamin H) has been recognized as a nutritional factor having the power to prevent or cure the dietary deficiency produced by a diet containing a high percentage of uncooked egg white.

This present application is not limited to the biotin molecule with the same properties as those described by the investigators listed above but is directed to a vitamin preparation having biotin activity when assayed by the methods employed by us. The invention is based upon our discovery that the plant materials containing compositions having biotin activity, when extracted with suitable organic solvents such as ethylene dichloride, esters, (ethyl acetate), ketones (acetone) and alcohols such as ethyl, isobutyl, ethanol and methanol, transferred the biotin activity to the solvent used. Such solvents, however, are not used in the sense of ordinary chemical extraction but must be solvents in which water is appreciably soluble since water plays an important role in the extraction process, either as a control concentration for the solvent or where such water appears as moisture in the starting material.

We have found an excellent starting material for practicing our invention to be the dried or partially dried molasses fermentation residue product sold commercially under the trademarks "Curbay BG" and "BY Feed" and while we do not desire to limit ourselves to the particular product of one manufacturer, we have found these two products suitable.

For the purpose of illustration, several examples of extraction by individual solvents are hereinafter set forth and the results of assays of the found end-product appended thereafter.

While the products sold under the above trade-marks are usually known to the trade as spray dried molasses fermentation residues, we do not desire to limit ourselves to the use of spray dried starting materials, since any solid material containing suitable amounts of biotin and not containing excessive amounts of moisture can be used with equal ease as the starting materials as will hereinafter appear.

*Example 1.*—One hundred grams of spray dried molasses fermentation residue having an assay of about three micrograms of biotin per gram were refluxed in a suitable apparatus for one and one-half hours with 200 cc. of ethyl acetate saturated with water. The solid is then removed by filtration. An assay of the filtrate shows it to contain biotin activity equivalent to one hundred and six micrograms of biotin and the residue obtained by evaporation weighs approximately 400 milligrams. A 34% yield of material having biotin activity is thus realized with an 85-fold concentration of such activity.

*Example 2.*—100 lbs. of spray dried molasses fermentation residue which will assay about 2.5 micrograms of biotin per gram are placed in a cylindrical vessel of suitable material having a cone-shaped bottom and a delivery tube. 45 gallons of acetone previously treated to contain 5% of water are allowed to flow to the vessel from a container at such a rate that the solid in the vessel remains immersed below the level of the liquid. Approximately 30 gallons of percolate are collected and the acetone removed therefrom by distillation. The recovered acetone may be used in subsequent processes after the water content thereof has been readjusted to 5%. The residue secured by the above process contains 40 milligrams of biotin activity in 1200 grams of solids, thereby representing a 15-fold concentration. No such amount of biotin activity or comparable concentration can be secured unless the water content of the acetone is in the neighborhood of 5%.

*Example 3.*—One pound of molasses fermentation residue is percolated with one liter of commercial methanol by the method described in Example 2. In this particular example it should be noted that the starting material is not spray dried, but must contain an amount of moisture not appreciably greater than 5% in order that a proper yield of biotin activity in the extract can be obtained. By filtration a light brown filtrate is obtained which assays 530 micrograms or 53% and has a biotin potency of 13 micrograms per gram of total solids.

*Example 4.*—50 grams of molasses fermentation residue which will assay 3.0 micrograms of biotin per gram are extracted by vigorous stirring in boiling absolute ethyl alcohol for one hour and then filtered. The filtrate assays 45 micrograms of biotin for a 30% yield with total solids of 2.6 grams. Here against the moisture content of the starting material is important.

*Example 5.*—50 grams of spray dried molasses fermentation residue which will assay 3.0 micrograms of biotin per gram are extracted by vigorous stirring in a boiling mixture of equal parts of ethyl alcohol and ethyl acetate containing 5% of water. Filtration from the insoluble material yields a solution containing biotin activity equivalent to 68 micrograms of biotin in 5.1 grams of total solids indicating a 45% yield.

*Example 6.*—100 grams of spray dried molasses fermentation residue which will assay about 5 micrograms of biotin activity per gram are stirred for three hours on a steam bath with 250 cc. of ethylene dichloride to which has been added 4 cc. of water which represents the approximate saturated solubility. A light yellow filtrate results which contains 480 micrograms of material having biotin activity in 400 mg. of solids which resulted after the solvent had been removed in vacuo. This represents a 240-fold purification and a nearly theoretical recovery. If the water is not added to the ethylene dichloride less than $\frac{1}{10}$ of the material having the biotin activity can be extracted.

Solvents other than those specifically set forth may be used if they meet the requirements for moisture content and have the desired extractive properties.

What we claim is:

1. The process of preparing a material having biotin-like activity which comprises extracting a molasses fermentation residue with an organic solvent selected from the group consisting of acetone, ethyl alcohol, methyl alcohol, ethyl acetate, and ethylene dichloride, containing water in a small amount not exceeding about 5%, and evaporating off the solvent and water from the resulting extract to obtain a residue having a multi-fold concentration in excess of about five times in biotin-like activity over that of said molasses fermentation residue.

2. The process of preparing a material having biotin-like activity which comprises extracting a molasses fermentation residue with acetone containing about 5% water, and evaporating off the acetone and water from the resulting extract to obtain a residue having a multi-fold concentration of about 13 times in biotin-like activity over that of said molasses fermentation residue.

3. The process of preparing a material having biotin-like activity which comprises extracting a molasses fermentation residue with methyl alcohol containing about 5% water, and evaporating off the methyl alcohol and water from the resulting extract to obtain a residue having a multi-fold concentration of about five times in biotin-like activity over that of said molasses fermentation residue.

4. The process of preparing a material having biotin-like activity which comprises extracting a molasses fermentation residue with a mixture consisting of equal parts of ethyl acetate and ethyl alcohol and containing about 5% water, and evaporating off the ethyl acetate, ethyl alcohol, and water to obtain a residue having a multi-fold concentration of about five times in biotin-like activity over that of said molasses fermentation residue.

*Table I*

| Solvent | Method | Amount Curbay BG used | Biotin extracted micrograms | Purity micrograms per gram | Purification |
|---|---|---|---|---|---|
| Acetone (5% water) | Percolation | 100 lbs | 38,600 | 32 | 13 fold. |
| Methanol (commercial) | do | 400 grams | 530 | 13.8 | 5.5 fold. |
| Ethanol ("Solox") | Hot extraction | 50 grams | 45 | 17.2 | 7 fold. |
| Isobutyl alcohol (5% water) | do | 50 grams | 72 | 16.7 | 7 fold. |
| Ethyl acetate and ethyl alcohol (50-50) (5% water) | do | 50 grams | 68 | 12.4 | 5 fold. |
| Ethyl acetate (2% water) | do | 100 grams | 106 | 26.0 | 85 fold. |
| Ethylene dichloride (1% water) | do | 100 grams | 480 | 1,200 | 240 fold. |

Similar extractions from fermentation residues of corn and other grains can be secured by utilization of related processes.

JOSEPH V. KARABINOS.
ELMER R. ECKHARDT.
WILBUR I. PATTERSON.